United States Patent
Hammersmith et al.

(10) Patent No.: US 7,317,799 B2
(45) Date of Patent: *Jan. 8, 2008

(54) CRYPTOGRAPHIC KEY DISTRIBUTION USING KEY FOLDING

(75) Inventors: Wolfgang S. Hammersmith, Seattle, WA (US); Lance R. Gaines, Orting, WA (US); Rod G. Nicholls, Seattle, WA (US); Byron T. Shank, La Grange, IN (US)

(73) Assignee: Vadium Technology, Inc., Tacoma, WA (US)

( * ) Notice: Subject to any disclaimer, the term of this patent is extended or adjusted under 35 U.S.C. 154(b) by 702 days.

This patent is subject to a terminal disclaimer.

(21) Appl. No.: 10/622,338

(22) Filed: Jul. 18, 2003

(65) Prior Publication Data

US 2004/0017917 A1    Jan. 29, 2004

Related U.S. Application Data

(60) Provisional application No. 60/397,113, filed on Jul. 19, 2002.

(51) Int. Cl.
*H04L 9/00* (2006.01)
(52) U.S. Cl. .................. 380/284; 380/44; 380/45; 380/260
(58) Field of Classification Search ............... None
See application file for complete search history.

(56) References Cited

U.S. PATENT DOCUMENTS

| | | | |
|---|---|---|---|
| 5,937,066 A | 8/1999 | Gennaro et al. | |
| 6,052,468 A | 4/2000 | Hillhouse | |
| 6,058,188 A | 5/2000 | Chandersekaran et al. | |
| 6,128,737 A | 10/2000 | Jakubowski et al. | |
| 6,226,742 B1 | 5/2001 | Jakubowski et al. | |
| 6,266,421 B1 | 7/2001 | Domyo et al. | |
| 6,411,227 B1* | 6/2002 | Fish | 341/65 |
| 6,862,582 B2* | 3/2005 | Harada et al. | 705/51 |
| 6,886,098 B1* | 4/2005 | Benaloh | 713/193 |
| 2001/0026619 A1* | 10/2001 | Howard et al. | 380/279 |
| 2006/0159272 A1* | 7/2006 | Ishiguro et al. | 380/280 |

* cited by examiner

*Primary Examiner*—Gilberto Barron
*Assistant Examiner*—Minh Dinh
(74) *Attorney, Agent, or Firm*—Sonnenschein Nath & Rosenthal LLP

(57) ABSTRACT

Methods, computer-readable media, and apparati for securely distributing a cryptographic key (C) from a first party(s) to a second party(s). A method embodiment of the present invention comprises the steps of combining (steps 1 and 2) the cryptographic key (C) with a transport key (T) to form a key set; encrypting (step 7) the key set to form an encrypted key set; distributing (step 8) the encrypted key set across a medium (3); and decrypting (step 9) the encrypted key set to reconstitute the cryptographic key (C) and the transport key (T).

2 Claims, 1 Drawing Sheet

CRYPTOGRAPHIC KEY DISTRIBUTION USING KEY FOLDING

RELATED APPLICATION

This patent application claims priority upon U.S. provisional patent application Ser. No. 60/397,113 filed Jul. 19, 2002, entitled "Key Folding Process for Cipher Systems", which patent application is hereby incorporated by reference in its entirety into the present patent application.

TECHNICAL FIELD

This invention pertains to the field of secure distribution (including distribution over insecure electronic means) of cryptographic keys, such as encryption keys for a One-Time Pad cipher system.

BACKGROUND ART

Many methods have been developed for encrypting plaintext into ciphertext so that a party having the appropriate key could decrypt the ciphertext to view the plaintext. Prior to the advent of computers, these methods were typically executed by humans with pen and paper, and were later adapted for use with telegraph and teletype. The keys necessary for encrypting and decrypting messages were distributed using couriers or other physical key distribution means. If the key used for encryption and decryption is as long as the message, and if the key is used only once, the encryption method is referred to as a One-Time Pad (OTP) encryption method. If the key is shorter than the plaintext message, such that the key, or a derivative of the key, must be used two or more times, the encryption method is referred to as a "repeating key" encryption method. Prior to the development of computers that included dense, efficient, and re-writable data storage devices, the use of the OTP encryption method for any but the shortest of messages was extremely difficult and time consuming, due to the sheer size and volume of the necessary encryption keys needed. For example, for a person to encrypt a one megabyte computer file, the OTP cipher requires a one megabyte encryption key that cannot be reused. This system requirement made the implementation of an OTP cipher system very difficult and nearly impractical, prior to the advent of computers. This caused the OTP cipher to be relegated to only the most critical situations involving very small messages. Therefore, almost no development has occurred on the use and deployment of the One-Time Pad. Repeating keys have been favored over One-Time Pad keys because they are much smaller (typically hundreds or thousands of times smaller) and can be reused.

A popular repeating key method known as public key encryption uses different but related public and private keys for encryption and decryption. With the development of computers that include fast, easy to use, and removable data storage media (like flash RAM memory devices using universal serial bus (USB) interfaces capable of secure storage and management of the very large encryption keys needed for practical OTP deployment), the use of OTP encryption for data communication and storage has become practical. Additionally, with the recent increases in computer speed and memory size, repeating key encryption methods previously thought to provide adequate security have been broken, and are being broken at an increasing rate. Given a large enough sample of encrypted messages and a fast enough computer with a large enough memory, any repeating key encryption scheme can be broken. The only known encryption method that is provably unbreakable and immune to these advances in computer processing power and speed is the One-Time Pad cipher.

One of the primary challenges to encrypted communications is the need to distribute, update, and replace encryption keys. Although this need applies to all cipher systems, it is especially acute with the One-Time Pad cipher. Prior to this invention, there was no secure way to distribute, update, and replace keys by any means other than to physically deliver said keys to each participant in the communications channel. In the present invention, OTP and other encryption keys can be distributed in a secure manner even over insecure electronic means like the Internet, rather than through physical distribution methods. Thus, the present invention geometrically increases the use, scalability, encryption volume, surge capabilities, and efficiency of the OTP and other cipher systems.

DISCLOSURE OF INVENTION

Methods, computer-readable media, and apparati for securely distributing a cryptographic key (C) from a first party(s) to a second party(s). A method embodiment of the present invention comprises the steps of combining (steps 1 and 2) the cryptographic key (C) with a transport key (T) to form a key set; encrypting (step 7) the key set to form an encrypted key set; distributing (step 8) the encrypted key set across a medium (3); and decrypting (step 9) the encrypted key set to reconstitute the cryptographic key (C) and the transport key (T).

BRIEF DESCRIPTION OF THE DRAWING

These and other more detailed and specific objects and features of the present invention are more fully disclosed in the following specification, reference being had to the accompanying drawing, in which.

DETAILED DESCRIPTION OF THE PREFERRED EMBODIMENTS

Figure 1:
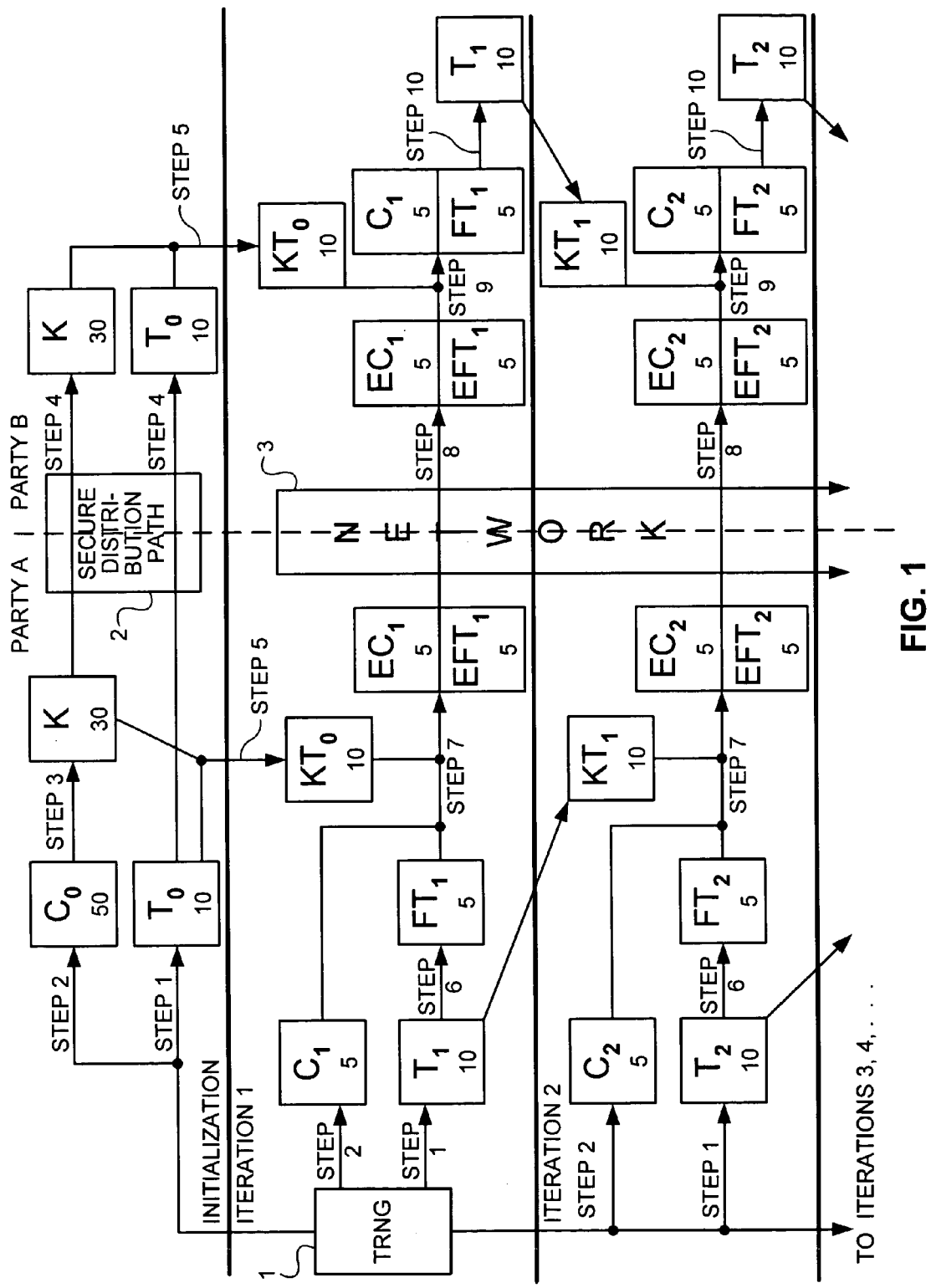
FIG. 1 is a state diagram illustrating operation of the present invention, with method steps shown as lines connecting the states.

As used throughout this specification and claims, the following terms have the following meanings:

"One-Time Pad Cipher" (OTP) is a unique cipher, or class of ciphers, that uses a key as long as the original plaintext message. The key is consumed during an exclusive OR (XOR) encryption process and must never be reused. Because the key is a consumable, it must be replaced when it reaches or nears the end of its volume.

"Key" is any sequence of symbols of any length that is used to encrypt and/or decrypt information in any form.

"Compression" is an algorithm or the product of an algorithm used for the reduction of the volume of binary data.

"Key folding" is a process of compressing a key so that the total volume, represented by the number of bits or bytes in the key, is one half of the original volume of the key before compression.

"LSB" means "least significant bit" or "least significant bits", i.e., the rightmost bit or bits of an ordered sequence of bits.

"MSB" means "most significant bit" or "most significant bits", i.e., the leftmost bit or bits of an ordered sequence of bits.

The invention will be illustrated for a computer system having words that are 8 bits (one byte) long. In other embodiments, the word length in bits is any power of two, i.e., 16 bits, 32 bits, 64 bits, etc. The invention is illustrated primarily with respect to a One-Time Pad cipher system. However, the method can be used to distribute any type of cryptographic key, such as a private (secret) key in a public key cryptosystem, or a symmetric key in a symmetric cryptosystem such as RC4. The illustrated method has 10 steps, and can be executed an arbitrarily large number of iterations (assuming that no key is lost, stolen, or corrupted), even when the keys C being distributed are OTP keys, when the compression performed in step six is 50% compression (key folding) or greater than 50% compression. Two iterations of the method, plus an initialization, are illustrated in FIG. 1. For each successive iteration, the subscripts on all the keys are incremented by one, as can be seen by examining FIG. 1.

In the example illustrated in FIG. 1, the communications keys C each have a volume of 5 (arbitrary) units, and the transport keys T each have a volume of 10 units, i.e., 50% compression is performed at step 6. An exception to the general rule is that the first communications key $C_0$ does not have to have a volume of 10 units, and in this case is shown as having 50 units.

In FIG. 1, key sizes are written below the capital letters designating the key types within the state boxes. Physical entities are enclosed within boxes, and method steps are identified on the lines connecting the boxes. Items to the left of the dashed vertical line passing through secure distribution path 2 and network 3 are under control of party A, and items to the right of said line are under the control of party B. Party A and party B can be humans or computers. Party A and party B wish to communicate with each other in a secure manner. Party A can be a key distribution center, in which case party A distributes communications keys C to at least two (and possibly many) parties including party B.

The boxes and lines connecting boxes that are illustrated in FIG. 1 can be implemented using software, firmware, hardware, or any combination thereof, e.g., one or more application specific integrated circuits (ASICs) can be used. The method steps can be embodied in software resident on any computer-readable medium or media, such as a hard disk, floppy disk, CD, DVD, etc. For example, one computer-readable medium may contain software for executing the steps performed by party A, and a second computer-readable medium may contain software for executing the steps performed by party B.

True Random Number Generator (TRNG) 1 is a cryptographically approved non-deterministic random number generator, i.e., one having no repeat period and an output rated for unbreakable cryptography. An example of TRNG 1 is Model SG100 made by Protego of Sweden. Secure distribution path 2 can comprise a trusted courier, a face-to-face meeting between party A and party B, biometric verification, or any other means deemed by party A and party B to be secure enough for the communications that the two parties wish to undertake. Network 3 can comprise any electronic or non-electronic network or signal path, such as the public switched telephone network (PSTN), a computer network, a wired or wireless LAN (Local Area Network), a wired or wireless WAN (Wide Area Network), a terrestrial microwave link, a satellite communications network, a telegraph over which the parties communicate using Morse code, a semaphore signaling system, or any combination of any of the above. Network 3 may comprise a secure network or an inherently insecure network such as the Internet.

Note that many of the below-described method steps appear at several places in FIG. 1.

In step 1, a transport key T is created. For the special case in which the compression method used in step 6 is key folding using bit swapping, T is created by using TRNG 1 to create a random sequence of bytes from any subset of bytes in which the first four MSB in each byte are identical. One example of a suitable range of bytes satisfying this criterion consists of those 16 consecutive bytes from the ASCII character set 64 (decimal) through 79 (decimal). This corresponds to the ASCII characters @ through O. This set of 16 bytes is illustrated in Table 1 as follows:

TABLE 1

| ASCII | Decimal | Binary |
|-------|---------|--------|
| @ | 64 | 0100 0000 |
| A | 65 | 0100 0001 |
| B | 66 | 0100 0010 |
| C | 67 | 0100 0011 |
| D | 68 | 0100 0100 |
| E | 69 | 0100 0101 |
| F | 70 | 0100 0110 |
| G | 71 | 0100 0111 |
| H | 72 | 0100 1000 |
| I | 73 | 0100 1001 |
| J | 74 | 0100 1010 |
| K | 75 | 0100 1011 |
| L | 76 | 0100 1100 |
| M | 77 | 0100 1101 |
| N | 78 | 0100 1110 |
| O | 79 | 0100 1111 |

Any subrange within the ASCII character set can be used, as long as the four MSB in the ASCII character set are identical. Since the ASCII character set is sequentially coded, there are 16 sequential subsets of characters within the full (for an 8-bit word) range 0 (decimal) through 255 (decimal) that have the same four MSB. Randomness sufficient for cryptography is not affected by using an ASCII subset any more than if the transport key T consisted solely of 1's and 0's, as long as the output of TRNG 1 is rated as being sufficient for unbreakable cryptography.

The creation of such a transport key T can be achieved by using a table lookup (e.g., a MIME type of table lookup), mathematical formula, or any other process to convert a random binary string or random byte sequence into a random byte sequence of 16 serial ASCII values having uniform MSB. One example of such a process is an expansion by a factor of two of a key randomly generated by TRNG 1 by means of concatenating a common MSB sequence at uniform four bit intervals throughout the length of the key.

When OTP encryption is used in step 7, as it must be when the communications keys C being distributed are OTP keys, the volume (size) of the transport key T must be greater than or equal to the combined sizes of the communications key C to be distributed in the next iteration plus the size of the compressed transport key FT to be used in the next iteration. Thus, the size of $T_0$ must be greater than or equal to the combined sizes of $C_1$ plus $FT_1$; the size of $T_1$ must be greater than or equal to the combined sizes of $C_2$ plus $FT_2$; etc.

Step 1 is one of the few steps that is performed during the initialization, as can be seen by examining FIG. 1. During said initialization, the initial transport key $T_0$ is created in step 1, then distributed from party A to party B via secure distribution path 2 in a special step 4 that is performed only during initialization. In an alternative embodiment (not illustrated), $T_0$ can be generated by party B and then distributed to party A across secure distribution path 2.

Step 2 is the creation of a communications key C. C is created by tasking TRNG 1 to create a random sequence from the full range of the ASCII character set 0 (decimal) trough 255 (decimal). Step 2 is another one of the few steps that is performed during the initialization. The initial communications key $C_0$ created during initialization can be any size, as long as $C_0$ is larger than the conversion key K (see step 3 below). $C_0$ need not be created in proportion relative to any transport key, because the main purpose of $C_0$ is to generate K. In one embodiment (not illustrated) $C_0$ is sent from party A to party B via secure distribution path 2, and is subsequently used by party B for use as a cryptographic key in encrypting and decrypting messages sent between party B and other parties, such as party A. In this embodiment, the only C that needs to be distributed from party A to party B by secure means is $C_0$—all the subsequent C's can be distributed over network 3, which can be insecure.

In the working iterations (iterations subsequent to the initialization), a new communications key C replaces a previous communications key C when the previous communications key C reaches or nears the end of its useful life. Thus, $C_1$ replaces $C_0$, $C_2$ replaces $C_1$, etc. Each communications key C is created by tasking TRNG 1 to create a random sequence from the full range of the ASCII character set 0 (decimal) through 255 (decimal). The method can be repeatable an arbitrarily large number of iterations, even in an OTP cipher system. In this case, $C_1$ has a volume 50% of the volume of the initially distributed transport key $T_0$, as illustrated in FIG. 1.

Step 3 is the creation of a conversion key K. In the method illustrated in FIG. 1, step 3 is performed just during initialization. In an alternative embodiment, step 3 is performed during each iteration of the method, to enhance security. In that case, K as it appears on FIG. 1 can be replaced by $K_0$, $K_1$, $K_2$, etc. In another alternative embodiment, K can be regenerated upon the occurrence of a preselected event, e.g., the expiration of a preselected period of time. In yet another alternative embodiment, K can be regenerated when it expires or is about to expire. For example, in the embodiment illustrated in FIG. 1, K has a size of 30 and each T has a size of 10. In this case, K may be used in the XORing process of step 5 to convert three different T's, after which K is regenerated.

In embodiments where K is generated in a numbered iteration, and not just during initialization, K can be encrypted and sent across network 3 from party A to party B for subsequent use by party B. Alternatively, party B can generate K from its corresponding C assuming that party B has knowledge as to how party A generated K from C. This knowledge (as well as other items of knowledge, such as the encryption algorithm used in step 7, the folding algorithm used in step 6, and the folding range used in step 6) can be sent from party A to party B by secure means prior to execution of the method iterations.

In one embodiment, K comprises the removed bytes that are created by removing a continuous sequence of bytes from communications key C. In this scenario, K typically has a size between 100 KB and 1 MB. This implies that the size of the communications key C from which K is extracted should be considerably greater than 1 MB, e.g., at least 20 MB. Since the sequence of bytes that is removed from C is continuous, the bytes in K exhibit the same cryptographically approved qualities of C, and are likewise from the range of the full ASCII character set 0 (decimal) through 255 (decimal).

In an alternative embodiment, K is generated by TRNG 1 and comprises a random sequence from the full range of the ASCII character set 0 (decimal) through 255 (decimal).

A given K can be smaller than its corresponding T, e.g., $K_0$ can be smaller than $T_0$, in which case K is a repeating key.

Step 4 is performed only during initialization, as described previously. At step 4, K and $T_0$ are distributed from party A to party B across secure distribution path 2.

Step 5 is the conversion of a transport key T into a key whose bytes are from the full range of ASCII values, without compromising the random properties of the transport key T. As stated earlier, a new K may be generated during each iteration, whether by carving K out of C or by tasking TRNG 1 to create K. In this case, step 5 is also performed once per iteration.

The conversion of T is accomplished by exclusive OR-ing (XORing) T with the corresponding (by subscript, in embodiments where there is more than one K) conversion key K. As stated previously, K can be a repeating key; if K is smaller than T, K can be reused until all the bits of T have been XORed. This XORing is done so that the encryption step (step 7 below) is performed on like character sets, thereby preserving the randomness of the ciphertext.

Step 6 comprises compressing the transport key T. If it is desired for the method to be continuable indefinitely in certain cipher systems including an OTP cipher system, the compression must entail key folding (i.e., compression by 50%), or compression by more than 50%. For distribution of certain types of non-OTP keys, step 6 may not be needed at all. The compression performed in step 6 (including compression by 50% or more) can be performed by any suitable technique, including one, or a combination of, the following techniques: advanced matrix arithmetic compression, vector based compression, quantum compression, sliding window compression, or key folding using bit swapping. The compression can be applied to individual bits, whole bytes, or partial bytes.

The compression technique that will now be described is key folding using bit swapping. This technique is accomplished by discarding the four MSB of each byte in T, and using these vacated positions to temporarily store the four LSB from half of the bytes of T. In the example illustrated above, the four MSB of the ASCII values 64 (decimal) through 79 (decimal) are 0100 for each byte in T, as can be seen from Table 1. These bits are discarded during folding, and reassembled later (in step 10) upon receipt by party B to recreate the original form of T. Table 2 illustrates key folding using bit swapping, as follows:

TABLE 2

| | T (transport key before folding) | | FT (folded transport key) | |
|---|---|---|---|---|
| | MSB | LSB | MSB | LSB |
| byte 1 | 0100 | 0011 | 0011 | 1001 |
| byte 2 | 0100 | 1001 | 0101 | 1101 |
| byte 3 | 0100 | 0101 | | |
| byte 4 | 0100 | 1101 | | |

It can be seen from the above example that the four LSB in byte 1 of T have been shifted to become the four MSB in byte 1 of FT, the four LSB in byte 2 of T are now the four LSB in byte 1 of FT, the four LSB in byte 3 of T are now the four MSB of byte 2 of FT, and the four LSB of byte 4 of T are now the four LSB in byte 2 of FT.

After folding, the folded transport key FT is 50% of its original size, because each folded byte in FT contains the information from two of the original bytes of T.

In step 7, for an OTP cipher system, an exclusive OR (XOR) is performed between the random converted transport key KT from the previous iteration of the method and a new (for that iteration) key set comprising a communications key C and a compressed transport key FT. The result of step 7 is transmittable ciphertext comprising an encrypted communications key EC plus an encrypted compressed transport key EFT.

For an OTP cipher system, the encryption performed in step 7 must be true OTP encryption, to preserve security. If the communications key C is a key for a weaker non-OTP cryptosystem, this requirement can be relaxed—the encryption in step 7 does not have to be OTP encryption, and XORing does not have to be used.

Step 8 is the distribution of EC and EFT from party A to party B via network 3.

While the first eight steps were performed by party A, steps 9 and 10 are performed by party B. At step 9, party B decrypts EC and EFT using KT from the previous iteration. The decryption key used in step 9 must be the same as the encryption key used in step 7 for that iteration, and the decryption algorithm must be consistent with the encryption algorithm. The result of step 9 is C plus FT.

In step 10, FT is uncompressed (unfolded in the illustrated embodiment). The unfolding process is exactly the reverse of the folding process described in step 6 above. Thus, for the illustrated method of key folding by bit swapping, FT is unfolded by splitting each byte of FT into two new bytes, moving the four MSB of each old FT byte into four LSB of a new T byte, and padding 0100 into the four MSB for each new T byte. It is assumed that party B doing the unfolding in step 10 knows the folding range and folding algorithm used by party A in step 6.

In the method illustrated in FIG. 1, transport key T sizes remain uniform, because 50% compression is achieved. Thus, key C upgrades can be performed to infinity, i.e., there can be an infinite number of iterations, even in an OTP cipher system. Throughout, the encryption is secure, because fresh communications keys C and transport keys T are being created for each iteration. If less than 50% compression is achieved in step 6, each successive iteration's communications key C will have a smaller and smaller size in many cipher systems, including the OTP cipher system, until the size of the communications key C becomes zero. Thus, the number of iterations is finite when less than 50% compression is utilized in these cipher systems.

The transport key T retrieved by party B is stored in a secure area within the purview of party B, awaiting the next iteration of the method.

The communications key C retrieved by party B is placed into service. This can entail using C for encrypted communications between party A and party B, or using C to communicate in a secure fashion with a third party. In the case of a One-Time Pad cipher system, the communications key C must be used just once if security is to be preserved. However, portions of a communications key C can be used for one communication, then subsequent portions of key C can be used for subsequent communications. Thus, party B can use a portion of a newly distributed communications key C to communicate with party A and another portion of the newly distributed communications key C to communicate with a third party.

When C expires or is about to expire, party B can communicate to party A that it is time for a new iteration of the method to take place, so that party B can receive a new communications key C. This message from party B to party A can be done automatically, and can be done via computer means, e.g., over network 3. In one embodiment, a monitoring device monitors the degree to which a given communications key C is being exhausted. This information can be displayed in graphical form to party B via a graphical user interface (GUI).

The repetition of the method steps can be terminated after a preselected event has occurred. For example, the method can be aborted every week, at which time the method is reinitialized. This may be done to enhance security.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention. For example, the present invention can be implemented in 16-bit words, 32-bit words, etc.

What is claimed is:

1. A method for securely distributing a cryptographic key, said method comprising the steps of:
    compressing a transport key to form a compressed transport key;
    combining the cryptographic key with the compressed transport key to form a key set;
    encrypting the key set to form an encrypted key set;
    distributing the encrypted key set across a medium; and
    decrypting the encrypted key set to reconstitute the cryptographic key and the transport key;
wherein:
    the compressing step is performed by a method of key folding using bit swapping;
    most significant bits of each byte in the transport key are discarded; and
    bit positions created by said discarded most significant bits in a given byte are filled with least significant bits from another byte of the transport key.

2. A method for securely distributing a cryptographic key, said method comprising the steps of:
    combining the cryptographic key with a transport key to form a key set;
    encrypting the key set to form an encrypted key set;
    distributing the encrypted key set across a medium; and
    decrypting the encrypted key set to reconstitute the cryptographic key and the transport key;
wherein the encrypting step is performed by a key comprising a transport key from a previous iteration of the method XORed with a conversion key; and the conversion key is a subset of the cryptographic key.

* * * * *